Patented Sept. 30, 1924.

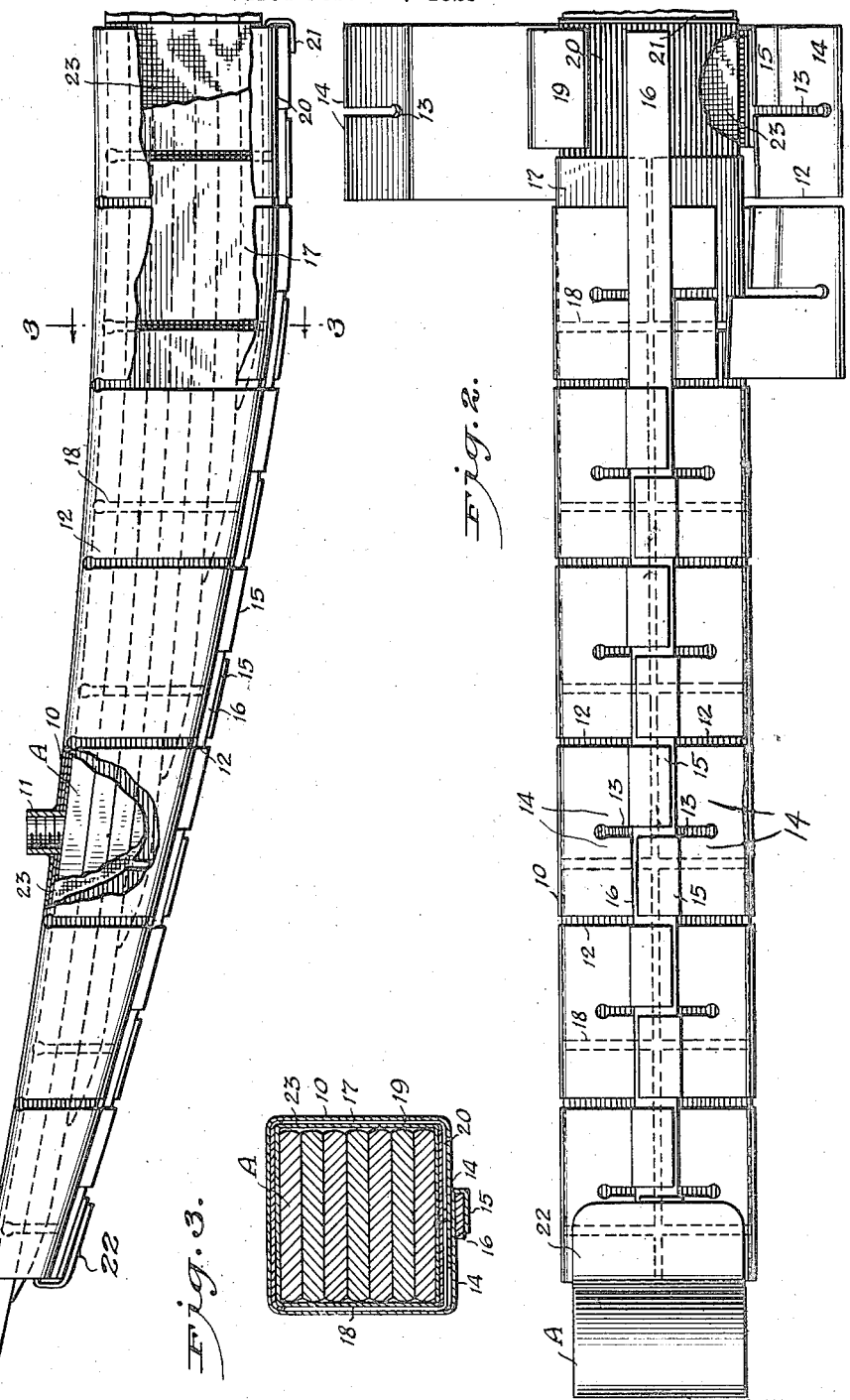

1,510,447

UNITED STATES PATENT OFFICE.

DENNIS B. D. BLAKE, OF QUINCY, ILLINOIS.

COVER FOR VEHICLE SPRINGS.

Application filed February 24, 1923. Serial No. 621,022.

*To all whom it may concern:*

Be it known that I, DENNIS B. D. BLAKE, a citizen of the United States of America, and a resident of Quincy, in the county of Adams and State of Illinois, have invented a new and Improved Cover for Vehicle Springs, of which the following is a description.

My invention relates to a cover for a laminated vehicle spring and employed for excluding water, dust and dirt from the spring to preserve the lubricant thereof and maintain the spring in a clean condition.

The general object of my invention is to provide a spring cover that will possess the maximum flexibility to respond to the movements of the spring and which will be at the same time effective in excluding dirt, water, etc.

Specifically, the invention has for an object to provide a novel fastening means for the cover to prevent twisting or looseness while obtaining the necessary flexibility for the cover to respond to the flexure of the spring and which may be applied and removed with convenience.

Reference is to be had to the accompanying drawings forming a part of this specification, it being understood that the drawings are merely illustrative of one example of the invention.

Figure 1 is a side elevation of a fragment of a spring with my improved cover applied thereto, parts of the cover being broken away and in section;

Figure 2 is an inverted plan view of the cover as applied, parts of the cover at the right being shown opened up in the interest of clearness;

Figure 3 is a cross section on the line 3—3, Figure 1.

In carrying out my invention in accordance with the illustrated example, I provide an outer shell or cover designated generally by the numeral 10, the same when applied to a spring A having the general form of a tapering split tube, the split or open side of which is at the under side of the spring. The outer shell or cover section 10 at the top is formed with a vertical nipple 11 through which lubricant may be supplied.

I form in the shell 10 slots 12 extending from the edges of the cover in opposite directions along the bottom portion and upwardly at the sides of said shell to points adjacent the top of the shell as will be apparent from a comparison of Figures 1 and 2. In addition to the slots 12 I form slots 13 of less length and extending from the opposite edges for less than the total width of the bottom portions as clearly seen in Figure 2. By reason of the slots 12 the cover presents separate members extending at the sides and beneath the spring A and these members are in turn divided by the slots 13, whereby broad flat tongues 14 are formed in the cover at opposite sides of the split or opening thereof. The terminals 15 of alternate tongues 14 of a pair are return bent and folded over onto a separate key strip 16. The folding over of the terminals 15 is at alternate sides of the opening in the split cover 10 and the terminals 15 of adjacent tongues are folded over in opposite directions to firmly interlock the fingers 14 of the cover with the key strip 16. Thus, a tongue 14 will extend straight beneath the turned-over terminal 15 at the opposite edge.

By the described arrangement the edges of the cover are securely fastened so that they cannot twist or become loose, while at the same time complete flexibility is attained because there can be a free relative sliding movement of the tongues 15 lengthwise of the key strip 16 and vice versa in response to the flexure of the vehicle spring A.

Within the outer shell or cover element 10 is an inner shell or cover element 17 in the form of a split tapering tube to conform to the taper of the spring and said inner shell 17 has transverse slots 18 formed therein extending in opposite directions to points adjacent the top of the cover. The slots 18 are in staggered relation to the slots 12 in the outer cover so that there will be no direct passage for rain or splashed water at the sides or bottom of the cover. Thus, the slots 12 are closed at the inside by the inner cover element 17 and the slots 18 are covered by the outer cover element 10.

Both cover elements are of sheet metal and are bent about the spring A and beneath the same to bring the edge portions of the inner cover sections in close or approximately abutting relation. The tongues 14 on one edge overlap the tongues 15 at the opposite side of the cover element.

At the under side of the cover within the inner shell or cover element 17 is a broad flat elongated platelike element 20 which extends the length of the cover or substantially so, thereby strengthening the joints of the cover sections 10 and 17 and materially contributing to exclude dirt and water.

At the wider portion of the spring, the element 20 is bent over the adjacent end of strip 16 as at 21 and at the smaller end of the spring, said element 20 is bent about the adjacent end of strip 16 and cover 10 as at 22.

In practice I employ a flexible wrapping 23 preferably of textile fabric about the spring A within the inner shell or cover element 17, the flat element 20 being disposed at the under side of the said wrapping. The element 20 may be return bent at one end to receive the adjacent end of the key strip 16 and limit longitudinal movement in the turned-over terminals 15.

Upon straightening out the bent tongue 22 the strip 16 may be pulled through the several hook terminals 15 so that the cover sections may be spread to slip them from the spring.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:—

1. In a protective cover for vehicle springs, a shell split longitudinally at the under side, said shell having slots extending from the split or opening in the under side of the shell transversely along the bottom and sides, and additional short slots extending into the bottom portions of the shell from the edges thereof and terminating short of the sides of the shell, said shell, between adjacent slots, presenting tongues, the tongues at one side overlapping material at the opposite side of the split or opening, and a key strip about which alternate tongues are bent.

2. In a protective cover for vehicle springs, a shell longitudinally split and having overlapping terminal portions at the under side in the form of tongues disposed on the opposite edges in pairs, and a key strip coacting with said tongues, alternate tongues at one edge portion being return bent about said key strip and the adjacent tongues on the opposite edge portion being return bent in the opposite direction about said key strip, the adjacent ones of said tongues extending beneath said key strip and beneath the return bent portions of said alternate tongues.

3. A protective cover for vehicle springs comprising a shell split longitudinally at the under side and presenting terminal edge portions overlapping at the under side, a key strip, to lock the said shell, alternate overlapping portions of the shell being returned bent about said key strip, the remaining overlapping portions passing straight beneath the key strip, a flat element above the key strip and having its ends bent over said key strip, and an inner shell split at the under side and having overlapping terminal portions.

DENNIS B. D. BLAKE.